United States Patent
Sakamoto et al.

(10) Patent No.: US 6,815,516 B2
(45) Date of Patent: Nov. 9, 2004

(54) COPOLYMER FORMED BY RING-OPENING POLYMERIZATION, PRODUCT OF HYDROGENATION OF COPOLYMER FORMED BY RING-OPENING POLYMERIZATION, AND PROCESS FOR PRODUCING THESE

(75) Inventors: Masato Sakamoto, Kawasaki (JP); Yasuo Tsunogae, Kawasaki (JP)

(73) Assignee: Zeon Corporation, Tokyo (JP)

( * ) Notice: Subject to any disclaimer, the term of this patent is extended or adjusted under 35 U.S.C. 154(b) by 221 days.

(21) Appl. No.: 10/148,956

(22) PCT Filed: Dec. 7, 2000

(86) PCT No.: PCT/JP00/08663
§ 371 (c)(1),
(2), (4) Date: Jun. 7, 2002

(87) PCT Pub. No.: WO01/42332
PCT Pub. Date: Jun. 14, 2001

(65) Prior Publication Data
US 2003/0018138 A1 Jan. 23, 2003

(30) Foreign Application Priority Data
Dec. 7, 1999 (JP) .......................................... 11-347329

(51) Int. Cl.[7] ............................ C08F 232/08; C08F 4/44
(52) U.S. Cl. ....................... 526/280; 526/281; 526/171; 526/172
(58) Field of Search ................................. 526/280, 281, 526/282, 171, 172

(56) References Cited

U.S. PATENT DOCUMENTS 6,207,779 B1 * 3/2001 Chang et al. ................ 526/280

FOREIGN PATENT DOCUMENTS

| JP | 52-098799 | | 8/1977 |
| JP | 11-130843 | | 5/1999 |
| JP | 11-130843 A | * | 5/1999 |
| JP | 11-171982 | | 6/1999 |
| JP | 11-171982 A | * | 6/1999 |

OTHER PUBLICATIONS

S. Matsumoto et al.; Polym. Prepr. 18, 110–115 (1977).

* cited by examiner

Primary Examiner—Robert D. Harlan
(74) Attorney, Agent, or Firm—Birch, Stewart, Kolasch & Birch, LLP

(57) ABSTRACT

A ring-opened metathesis copolymer formed by the ring-opening metathesis copolymerization of a cycloolefin monomer having a carboxylic anhydride group selected from bicycloheptene derivatives, tetracyclododecene derivatives and hexacycloheptadecene derivatives with a cycloolefin monomer selected from bicycloheptene derivatives, tetracycloheptene derivatives and hexacycloheptene derivatives; and a hydrogenation product of the copolymer. This copolymer is produced by using a polymerization catalyst comprises an organoruthenium compound having a heterocyclic carbene compound as a ligand. The ring-opened metathesis copolymer and the hydrogenation product thereof have a low dielectric constant, a low water absorption, a high adhesion to metals and a high heat resistance.

10 Claims, No Drawings

COPOLYMER FORMED BY RING-OPENING POLYMERIZATION, PRODUCT OF HYDROGENATION OF COPOLYMER FORMED BY RING-OPENING POLYMERIZATION, AND PROCESS FOR PRODUCING THESE

This application is the national phase under 35 U.S.C. § 371 of PCT International Application No. PCT/JP00/08663 which has an International filing date of Dec. 7, 2000, which designated the United States of America.

TECHNICAL FIELD

This invention relates to a novel copolymer produced by a ring-opening metathesis polymerization of a cycloolefin monomer (which copolymer is hereinafter referred to as "ring-opened metathesis copolymer" or merely "copolymer" when appropriate), and a hydrogenation product of the ring-opened metathesis copolymer. More particularly, this invention relates to a ring-opened metathesis copolymer and a hydrogenation product of the copolymer, which exhibit good and balanced low-dielectric property, low water-absorption and high adhesion to metal, and excellent heat resistance. This invention further relates to a process for producing the copolymer and a process for producing the hydrogenation product of the copolymer.

BACKGROUND ART

Hitherto known ring-opened metathesis copolymers from cycloolefin monomers and hydrogenation products of the copolymers have excellent heat resistance, electrical characteristics and low water-absorption, but have a problem of poor adhesion to metal and other materials.

To solve this problem, a method of polymerizing or copolymerizing a cycloolefin monomer having a polar group was proposed. More specifically, a ring-opened metathesis copolymer produced from a cycloolefin monomer having a polar group such as an ester group or a cyano group, and a hydrogenation product thereof were proposed. The proposed copolymer and the hydrogenation product thereof exhibit an enhanced adhesion as compared with the conventional ring-opened metathesis copolymer having no polar group and the hydrogenation product thereof, but, the adhesion is improved only in some small degree, and the dielectric properties and water-absorption are undesirably enhanced.

A ring-opened metathesis homopolymer from norbornene-5,6-dicarboxylic anhydride which is a most popular cycloolefin monomer having a carboxylic anhydride group was proposed (Japanese Examined Patent Publication No. S60-43365, and Polym. Prepr., 18, 110–115 (1177). Further, a method was proposed wherein tetracyclododecene-3,4-dicarboxylic anhydride is homopolymerized, the resulting homopolymer is hydrogenated, and then, a part of the carboxylic anhydride groups of the hydrogenated homopolymer is hydrolyzed with an acid (Japanese Unexamined Patent Publication No. H11-130843). However, the above-mentioned homopolymers of cycloolefin monomers having a carboxylic anhydride group and hydrogenation products thereof still have a problem such that the dielectric properties and low water-absorption are greatly inferior to the polymers produced from a cycloolefin monomer having no polar group. It is described in the above-cited Japanese examined patent publication that norbornene-5,6-dicarboxylic anhydride can be copolymerized with other cycloolefin monomers, but, norbornene-5,6-dicarboxylic anhydride has a greatly different polymerizability from that of a norbornene monomer having no polar group, and therefore, the copolymerization reaction does not occur to any significant degree and a copolymer having a desired copolymerization ratio and a desired molecular weight cannot be obtained.

DISCLOSURE OF THE INVENTION

A first object of the present invention is to provide a highly heat-resistant ring-opened metathesis copolymer and a hydrogenation product thereof, which have excellent electrical properties, low water-absorption and high adhesion to metal and other materials.

A second object of the present invention is to provide processes for producing with high efficiency the above-mentioned ring-opened metathesis copolymer and a hydrogenation product thereof.

To achieve the above-mentioned objects, the present inventors made extensive research and found that, when an organic ruthenium compound having a specific ligand is used as a polymerization catalyst, a cycloolefin monomer having a carboxylic anhydride group can be copolymerized with a cycloolefin monomer having no substituent or a hydrocarbon substituent at any desired copolymerization ratio, and further that the resulting copolymer and a hydrogenation product thereof satisfy mutually contradictory properties, namely exhibit good and balanced electrical properties, low water-absorption and adhesion to metal. Based on these findings, the present invention has been completed.

In one aspect of the present invention, there is provided a ring-opened metathesis copolymer characterized by comprising repeating units [A] represented by the following general formula (1):

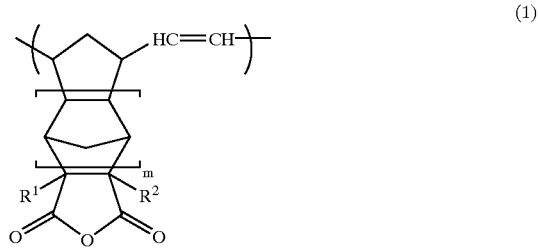

(1)

wherein O is an oxygen atom, $R^1$ and $R^2$ independently represent a hydrogen atom or a hydrocarbon group having 1 to 20 carbon atoms, and m is an integer in the range of 0 to 2, and repeating units [B] represented by the following general formula (2):

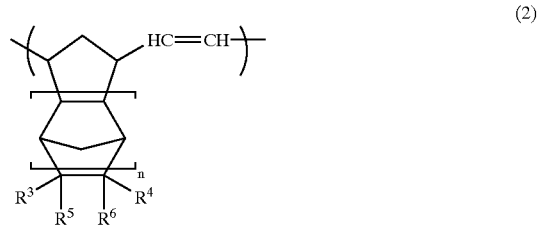

(2)

wherein $R^3$, $R^4$, $R^5$ and $R^6$ independently represent a hydrogen atom or a hydrocarbon group having 1 to 20 carbon atoms wherein $R^3$ or $R^5$ may be bonded together with $R^4$ or $R^6$ to form a ring, and n is an integer of 0, 1 or 2; the ratio of repeating units [A]/repeating units [B] being in the range of 5/95 to 95/5 by mol; said copolymer having a weight average molecular weight in the range of 10,000 to 1,000,000 as measured by gel permeation chromatography and expressed in terms of polystyrene.

In another aspect of the present invention, there is provided a hydrogenation product of the above-mentioned ring-opened metathesis copolymer, wherein 50 to 100% of the double bonds in the backbone chain of the ring-opened metathesis copolymer have been hydrogenated.

In still another aspect of the present invention, there is provided a process for producing the ring-opened metathesis copolymer, characterized by copolymerizing at least one kind of a cycloolefin monomer represented by the following general formula (3):

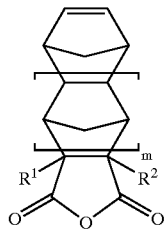

(3)

wherein O, $R^1$, $R^2$ and m are the same as those defined for formula (1), with at least one kind of a cycloolefin monomer represented by the following general formula (4):

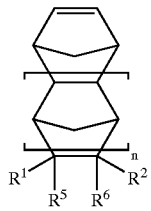

(4)

wherein $R^3$, $R^4$, $R^5$, $R^6$ and n are the same as those defined for formula (2), by a ring-opening metathesis copolymerization procedure using a polymerization catalyst comprising as a principal ingredient an organic ruthenium compound having coordinated thereto a heterocyclic carbene compound as ligand.

In a further aspect of the present invention, there is provided a process for producing a hydrogenation product of the above-mentioned ring-opened metathesis copolymer, characterized by hydrogenating the above-mentioned ring-opened metathesis copolymer in the presence of hydrogen by using a hydrogenation catalyst.

BEST MODE FOR CARRYING OUT THE INVENTION

The cycloolefin monomer represented by formula (3) used in the present invention is a cycloolefin monomer having a carboxylic anhydride group, which includes bicyoheptene derivatives [m=0 in formula (3)], tetracyclododecene derivatives [m=1 in formula (3)] and hexacycloheptadecene derivatives [m=2 in formula (3)].

In formula (3), O represents an oxygen atom, and $R^1$ and $R^2$ independently represent a hydrogen atom or a hydrocarbon group having 1 to 20 carbon atoms. The hydrocarbon group means a straight chain, a branched chain or a cyclic hydrocarbon group, which may be either saturated or unsaturated. As specific examples of the hydrocarbon group, there can be mentioned alkyl groups such as methyl, ethyl, propyl, butyl, pentyl, hexyl, heptyl, octyl, nonyl, decyl, undecyl, dedecyl, tridecyl, tetradecyl, pentadecyl, hexadecyl, heptadecyl, octadecyl and nonadecyl; and corresponding alkenyl groups, such as vinyl and allyl groups; corresponding alkadienyl, alkatrienyl and alkatetraenyl groups; and cycloalkyl groups, cycloalkenyl groups and aryl groups.

As specific examples of the cycloolefin monomer of formula (3), there can be mentioned bicycloheptene derivatives such as bicyclo[2.2.1]hept-5-ene-2,3-dicarboxylic anhydride, 2-methylbicyclo[2.2.1]-hept-5-ene-2,3-dicarboxylic anhydride and 2-phenylbicyclo-[2.2.1]hept-5-ene-2,3-dicarboxylic anhydride; tetracyclododecene derivatives such as tetracyclo-[4.4.0.1$^{2,5}$.1$^{7,10}$]-8-dodecene-3,4-dicarboxylic anhydride, 3-methyltetracyclo [4.4.0.1$^{2,5}$.1$^{7,10}$]-8-dodecene-3,4-dicarboxylic anhydride, 3-phenyltetracyclo[4.4.0.1$^{2,5}$.1$^{7,10}$]-8-dodecene-3,4-dicarboxylic anhydride and 3-n-hexyltetracyclo[4.4.0.1$^{2,5}$.1$^{7,10}$]-8-dodecene-3,4-dicarboxylic anhydride; and hexacyclheptadecene derivatives such as hexacyclo [6.6.1.1$^{3,6}$.1$^{10,13}$.0$^{2,7}$.0$^{9,14}$]-11-heptadecene-4,5-dicarboxylic anhydride, 4-methylhexacyclo-[6.6.1.1$^{3,6}$.1$^{10,13}$.0$^{2,7}$.0$^{9,14}$]-11-heptadecene-4,5-dicarboxylic anhydride and 4-phenylhexacyclo[6.6.1.1$^{3,6}$.1$^{10,13}$.0$^{2,7}$.0$^{9,14}$]-11-heptadecene-4,5-dicarboxylicanhydride. Of these monomers, bicyclo[2.2.1]hept-5-ene-2,3-dicarboxylic anhydride, tetracyclo[4.4.0.1$^{2,5}$.1$^{7,10}$]-8-dodecene-3,4-dicarboxylic anhydride and hexacyclo[6.6.1.1$^{3,6}$.1$^{10,13}$.0$^{2,7}$.0$^{9,14}$]-11-heptadecene-4,5-dicarboxylic anhydride are preferable because of low production cost and good handling characteristics.

The olefin monomer represented by formula (4) used in the present invention is a cycloolefin monomer which has no substituent or has a hydrocarbon group or hydrocarbon groups, each having 1 to 20 carbon atoms. The olefin monomer includes bicycloheptene derivatives wherein n=0 and any of $R^3$ and $R^5$ is not bonded with $R^4$ or $R^6$ in formula (4), bicycloheptene derivatives wherein n=0 and $R^2$ or $R^5$ is bonded together with $R^4$ or $R^6$ to form a ring in formula (4), tetracyclododecene derivatives wherein n=1 in formula (4), and hexacycloheptadecene derivatives wherein n=2 in formula (4).

The above-mentioned $R^3$ through $R^6$ in formula (4) independently represent a hydrogen atom or a hydrocarbon group having 1 to 20 carbon atoms. In the case when any of $R^3$ and $R^5$ is not bonded with $R^4$ or $R^6$, as specific examples of the hydrocarbon group constituting $R^3$ through $R^6$, there can be mentioned those which are recited as examples of the hydrocarbon group constituting $R^1$ and $R^2$ in formula (3). In the case where $R^3$ or $R^5$ is bonded together with $R^4$ or $R^6$ to form a ring, as specific examples of the hydrocarbon group constituting $R^3$ through $R^6$, there can be mentioned vinylene, methylene, dimethylene, trimethylene, tetramethylene, pentamethylene, hexamethylene and heptamethylene groups. These hydrocarbon groups may further have a hydrocarbon group as a substituent.

As specific examples of the bicycloheptene derivatives wherein n=0 and any of $R^3$ and $R^5$ is not bonded with $R^4$ or $R^6$ in formula (4), there can be mentioned bicyclo[2.2.1] hept-5-ene, 2-methylbicyclo[2.2.1]hept-5-ene, 2-ethylbicyclo[2.2.1]-hept-5-ene, 2-propylbicyclo[2.2.1] hept-5-ene, 2-butylbicyclo[2.2.1]hept-5-ene, 2-pentylbicyclo[2.2.1]hept-5-ene, 2-hexylbicyclo[2.2.1] hept-5-ene, 2-heptylbicyclo-[2.2.1]hept-5-ene, 2-octylbicyclo[2.2.1]hept-5-ene, 2-nonylbicyclo[2.2.1]hept-5-ene, 2-decylbicyclo[2.2.1]hept-5-ene, 2-undecylbicyclo [2.2.1]hept-5-ene, 2-dodecylbicyolo-[2.2.1]hept-5-ene, 2-tridecylbicyclo[2.2.1]hept-5-ene, 2-tetradecylbicyclo [2.2.1]hept-5-ene, 2-pentadecylbicyclo-[2.2.1]hept-5-ene, 2-hexadecylbicyclo[2.2.1]hept-5-ene, 2-heptadecylbicyclo [2.2.1]hept-5-ene, 2-octadecylbicyclo-[2.2.1]hept-5-ene, 2-nonadecylbicyclo[2.2.1]hept-5-ene, 2-vinylbicyclo[2.2.1] hept-5-ene, 2-ethylidenobicyclo[2.2.1]-hept-5-ene, 2-cyclohexylbicyclo[2.2.1]hept-5-ene, 2-cyclohexenylbicyclo[2.2.1]hept-5-ene and 2-phenylbicyclo-[2.2.1]hept-5-ene. Especially, when bicyclo[2.2.1]hept-5-ene, 2-hexylbicyclo[2.2.1]hept-5-ene, 2-decylbicyclo[2.2.1]hept-5-ene or 2-phenylbicyclo[2.2.1] hept-5-ene is used, a copolymer having highly balanced heat resistance and mechanical strength can be obtained.

As specific examples of the bicycloheptene derivatives wherein n=0 and $R^3$ or $R^5$ is bonded together with $R^4$ or $R^6$ to form a ring in formula (4), there can be mentioned tricyclo-[4.3.1$^{2,5}$.0]-3-decene, tricyclo[4.3.1$^{2,5}$.0]deca-3,7-diene (another name: dicyclopentadiene), tetracyclo-[6.5.1$^{2,5}$.0$^{1,6}$.0$^{8,13}$]tetradeca-3,8,10,12-tetraene (another name: 1,4-methano-1,4,4a,9a-tetrahydrofluorene) and tetracyclo[6.6.1$^{2,5}$.0$^{1,6}$.0$^{8,13}$]pentadeca-3,8,10,12-tetraene (another name: 1,4-methano-1,4,4a,5,10,10a-hexahydroanthracene). Especially, when tricyclo[4.3.1$^{2,5}$.0]-3-decene, tricyclo[4.3.1$^{2,5}$.0]deca-3,7-diene or tetracyclo-[6.5.1$^{2,5}$.0$^{1,6}$.0$^{8,13}$]tetradeca-3,8,10,12-tetraene is used, a copolymer having highly balanced heat resistance and solubility in organic solvents can be obtained.

As specific examples of the tetracyclododecene derivatives wherein n=1 in formula (4), there can be mentioned tetracyclo[4.4.0.1$^{2,5}$.1$^{7,10}$]-3-dodecene, 8-methyltetracyclo [4.4.0.1$^{2,5}$.1$^{7,10}$]-3-dodecene, 8-ethyltetracyclo[4.4.0.1$^{2,5}$.1$^{7,10}$]-3-dodecene, 8-n-hexyltetracyclo[4.4.0.1$^{2,5}$.1$^{7,10}$]-3-dodecene, 8-cyclohexyltetracyclo[4.4.0.1$^{2,5}$.1$^{7,10}$]-3-dodecene, 8-cyclopentyltetracyclo[4.4.0.1$^{2,5}$.1$^{7,10}$]-3-dodecene, 8-methylidenetetracyclo[4.4.0.1$^{2,5}$.1$^{7,10}$]-3-dodecene, 8-ethylidenetetracyclo[4.4.0.1$^{2,5}$.1$^{7,10}$]-3-dodecene, 8-vinyltetracyclo[4.4.0.1$^{2,5}$.1$^{7,10}$]-3-dodocone, 8-propenyltetracyclo[4.4.0.1$^{2,5}$.1$^{7,10}$]-3-dodecene, 8-cyclohexenyltetracyclo[4.4.0.1$^{2,5}$.1$^{7,10}$]-3-dodecene, 8-cyclopentenyltetracyclo[4.4.0.1$^{2,5}$.1$^{7,10}$]-3-dodecene and 8-phenyltetraoyclo[4.4.0.1$^{2,5}$.1$^{7,10}$]-3-dodecene. Especially, when tetracyclo[4.4.0.1$^{2,5}$.1$^{7,10}$]-3-dodecene or 8-ethylidenetetracyclo[4.4.0.1$^{2,5}$.1$^{7,10}$]-3-dodecene is used, a copolymer having highly balanced heat resistance and solubility in organic solvents can be obtained.

As specific examples of the hexacycloheptadecene derivatives wherein n=2 in formula (4), there can be mentioned hexacyclo[6.6.1.1$^{3,6}$.1$^{10,13}$.0$^{2,7}$.0$^{9,14}$]-4-heptadecene, 11-methylhexacyclo[6.6.1.1$^{3,6}$.1$^{10,13}$.0$^{2,7}$.0$^{9,14}$]-4-heptadecene and 11-phenylhexacyclo[6.6.1.1$^{3,6}$.1$^{10,13}$.0$^{2,7}$.0$^{9,14}$]-4-heptadecene. Especially, when hexacyclo [6.6.1.1$^{3,6}$.1$^{10,13}$.0$^{2,7}$.0$^{9,14}$]-4-heptadecene or 11-phenylhexacyclo[6.6.1.1$^{3,6}$.1$^{10,13}$.0$^{2,7}$.0$^{9,14}$]-4-heptadecene is used, a copolymer having highly balanced heat resistance and solubility in organic solvents can be obtained.

The above-mentioned cycloolefin monomers may be used either alone or as a combination of at least two thereof. To obtain a ring-opened metathesis copolymer having excellent heat resistance and solubility in organic solvents, cycloolefin monomers with 3 to 6 rings, namely, tetracyclododeoene derivatives, hexacycloheptadecene derivatives, and bicycloheptene derivatives wherein $R^3$ is bonded together with $R^4$ to form a ring are preferably used. Of these, tetracyclododecens derivatives, and bicycloheptene derivatives wherein $R^3$ is bonded together with $R^4$ to form a ring are especially preferable. As specific examples of the especially preferable cycloolefin monomers, there can be mentioned tricyclo [4.3.1$^{2,5}$.0]-3-decene, tricyclo-[4.3.1$^{2,5}$.0]-deca-3,7-diene, tetracyclo[6.5.1$^{2,5}$.0$^{1,6}$.0$^{8,13}$]-tetradeca-3,8,10,12-tetraene, tetracyclo[4.4.0.1$^{2,5}$.1$^{7,10}$]-3-dodecene and 8-ethylidenetetracyclo[4.4.0.1$^{2,5}$.1$^{7,10}$]-3-dodecene.

The polymerization catalyst used in the present invention comprises as a principal ingredient an organic ruthenium compound having coordinated thereto a heterocyclic carbene compound as ligand, preferably an organic ruthenium compound having a neutral electron-donating ligand, represented by the following formula (5), (6) or (7):

(5)

wherein $M^1$ is a ruthenium atom, $Y^1$s independently represent an anionic ligand, and $L^1$s independently represent a neutral electron-donating ligand wherein at least one of $L^1$s is a heterocyclic carbene compound. Two, three or four ligands selected from the group of $Y^1$s and $L^1$s may form together a multidentate chelate ligand. m and n independently represent an integer in the range of 1 to 4, and x is an integer in the range of 1 to 6.

(6)

wherein $M^2$ is a ruthenium atom, $L^2$s independently represent a neutral electron-donating ligand wherein at least one of $L^2$s is a heterocyclic carbene compound, $Y^2$s independently represent an anionic ligand, Qs independently represent a hydrogen atom or a hydrocarbon group having 1 to 20 carbon atoms which may have a substitutent having a halogen, nitrogen, oxygen, silicon, phosphorus or sulfur atom, r is an integer of 1 or 2, and p, q and y independently represent an integer in the range of 1 to 4.

(7)

wherein $M^3$ is a ruthenium atom, $L^3$s independently represent a neutral electron-donating ligand wherein at least one of $L^3$s is a heterocyclic carbene compound. $Y^3$s independently represent an anionic ligand, X represents a counter anion, and s and t independently represent an integer in the range of 1 to 4, and z is an integer of 1 or 2.

The anionic ligand is a ligand having a negative charge when it is isolated from the central metal, and the neutral ligand is a ligand having a neutral charge when it is isolated from the central metal. The counter anion is an anion forming an ion pair with the ruthenium cation, and the counter anion used is not particularly limited provided that it is capable of forming such ion pair.

As specific examples of the anionic ligands $Y^1$, $Y^2$ and $Y^3$ in formulae (5), (6) and (7), there can be mentioned halogens such as F, Br, Cl and I, hydrido, diketonato groups such as acetylacetonato groups, cyclopentadienyl groups, an allyl group, alkenyl groups, alkyl groups, aryl groups, alkoxy groups, aryloxy groups, alkoxycarbonyl groups, arylcarboxyl groups, a carboxyl group, alkyl- or aryl-sulfonate groups; alkylthio groups, alkenylthio groups, arylthio groups, alkylsulfonyl groups and alkylsulfinyl groups. Of these, halogens, cyclopentadienyl groups, an allyl group, alkyl groups and aryl groups are preferable because these give a catalyst exhibiting a high polymerization activity.

As specific examples of the neutral electron-donating ligands $L^1$, $L^2$ and $L^3$ in formulae (5), (6) and (7), there can be mentioned oxygen, water, carbonyls, amines, pyridines, ethers, nitriles, esters, phosphines, phosphinites, phosphites, stibines, sulfoxides, thioethers, amides, aromatics, diolefins (including cyclodiolefins), olefins (including cycloolefins), isocyanides, thiocyanates and heterocyclic carbene compounds. Especially, when at least one heterocyclic carbene compound is coordinated, a catalyst exhibiting a high polymerization activity and easily giving the copolymer of the present invention is obtained.

The heterocyclic carbene compound includes, for example, compounds represented by the following general formulae (8) and (9):

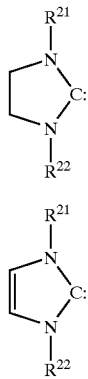

In formulae (8) and (9), $R^{21}$ and $R^{22}$ independently represent a hydrogen atom or a hydrocarbon group having 1 to 20 carbon atoms which may have a substituent containing at least one kind of atom selected from halogen, oxygen, nitrogen, sulfur, phosphorus and silicon atoms.

As specific examples of the heterocyclic carbene compound of formula (8), there can be mentioned 1,3-diisopropylimidazolidin-2-ylidene, 1,3-dicyclohexylimidazolidin-2-ylidene, 1,3-di(methylphenyl)imidazolidin-2-ylidene, 1,3-di(2,4,6-trimethylphenyl)imidazolidin-2-ylidene, 1,3-di(methylnaphthyl)imidazolidin-2-ylidene, 1,3-diadamantylimidazolidin-2-ylidene, 1,3-diphenylimidazolidin-2-ylidene, 1,3,4,5-tetraphenylimidazolidin-2-ylidene and 1,3,4,5-tetramethylimidazolidin-2-ylidene.

As specific examples of the heterocyclic carbene compound of formula (9), there can be mentioned 1,3-diisopropyl-4-imidazolin-2-ylidene, 1,3-dicyclohexyl-4-imidazolin-2-ylidene, 1,3-di(methylphenyl)-4-imidazolin-2-ylidene, 1,3-di(2,4,6-trimethylphenyl)-4-imidazolin-2-ylidene, 1,3-di(methylnaphthyl)-4-imidazolin-2-ylidene, 1,3-diadamantyl-4-imidazolin-2-ylidene, 1,3-diphenyl-4-imidazolin-2-ylidene, 1,3,4,5-tetramethyl-4-imidazolin-2-ylidene and 1,3,4,5-tetraphenylimidazolin-2-ylidene.

The heterocyclic carbene compound used in the present invention further includes heterocyclic carbene compounds other than those of formula (8) and (9). As examples of such heterocyclic carbene compounds, there can be mentioned 1,3,4-triphenyl-2,3,4,5-tetrahydro-1H-1,2,4-triazol-5-ylidene, 3-(2,6-diisopropylphenyl)-2,3,4,5-tetrahydrothiazol-2-ylidene, 1,3-dicyclohexylhexahydropyrimidin-2-ylidene, N,N,N',N'-tetraisopropylformamidinylidene, 1,3,4-triphenyl-4,5-dihydro-1H-1,2,4-triazol-5-ylidene and 3-(2,6-diisopropylphenyl)-2,3-dihydrothiazol-2-ylidene.

Among the above-recited heterocyclic carbene compounds, those which have bulky substituents at heteroatoms adjacent to the carbene, are especially preferable. As specific examples of the especially preferable heterocyclic carbene compounds, there can be mentioned 1,3-diisopropylimidazolidin-2-ylidene, 1,3-dicyclohexylimidazolidin-2-ylidene, 1,3-di(methylphenyl)imidazolidin-2-ylidene, 1,3-di(2,4,6-trimethylphenyl)imidazolidin-2-ylidene, 1,3-di(methylnaphthyl)imidazolidin-2-ylidene, 1,3-diadamantylimidazolidin-2-ylidene, 1,3-diphenylimidazolidin-2-ylidene, 1,3,4,5-tetraphenylimidazolidin-2-ylidene, 1,3-diisopropyl-4-imidazolin-2-ylidene, 1,3-dicyclohexyl-4-imidazolin-2-ylidene, 1,3-di(methylphenyl)-4-imidazolin-2-ylidene, 1,3-di(2,4,6-trimethylphenyl)-4-imidazolin-2-ylidene, 1,3,4-triphenyl-2,3,4,5-tetrahydro-1H-1,2,4-triazol-5-ylidene, 3-(2,6-diisopropylphenyl)-2,3,4,5-tetrahydrothiazol-2-ylidene and 1,3-dicyclohexylhexahydropyrimidin-2-ylidene.

As specific examples of Q in the above-mentioned formula (6), there can be mentioned hydrogen, alkenyl groups, alkinyl groups, alkyl groups, alkylidene groups, aryl groups, a carboxyl group, alkoxy groups, alkenyloxy groups, alkinyloxy groups, aryloxy groups, alkoxycarbonyl groups, alkylthio groups, alkenylthio groups, arylthio groups, alkylsulfonyl groups and alkylsulfinyl groups. Of these, alkyl groups, alkylidene groups, aryl groups, alkoxy groups, aryloxy groups, alkylthio groups and arylthio groups, which have 1 to 100 carbon atoms, are preferable because these are liable to give a catalyst having a high polymerization activity.

As specific examples of X in the above-mentioned formula (7), there can be mentioned $BF_4^-$, $B(C_6H_5)_4^-$, $B(C_6F_5)_4^-$, $PF_6^-$, $SbF_6^-$, $ClO_4^-$, $IO_4^-$, p-toluenesulfonic acid anion and trifluoromethanesulfonic acid anion. Of these counter anions, $BF_4^-$, $B(C_6F_5)_4^-$, $PF_6^-$ and $SbF_6^-$, are preferable because these are liable to give a catalyst having a high polymerization activity.

As specific examples of the polymerization catalyst, the following compounds can be mentioned. That is, as specific examples of the polymerization catalyst represented by formula (5), there can be mentioned chloro(cyclopentadienyl)-bis(1,3-diisopropylimidazolin-2-ylidene)ruthenium, chloro(cyclopentadienyl)bis(1,3-dicyclohexylimidazolin-2-ylidene)ruthenium, chloro(cyclopentadienyl)bis(1,3-diisopropylimidazolin-2-ylidene)ruthenium, dichlorobis[(1,3-diisopropylimidazolin-2-ylidene)chlororuthenium], dichlorobis[(1,3-dicyclohexylimidazolin-2-ylidene)-chlororuthenium] and dichlorobis[(1,3-dimesitylimidazolin-2-ylidene)chlororuthenium].

As specific examples of the polymerization catalyst represented by formula (6), there can be mentioned ruthenium compounds having coordinated thereto two heterocyclic carbene compounds, such as bis(1,3-diisopropylimidazolidin-2-ylidene)benzylideneruthenium dichloride, bis(1,3-dicyclohexylimidazolidin-2-ylidene)benzylideneruthenium dichloride, bis(1,3-diisopropyl-4-imidazolin-2-ylidene)benzylideneruthenium dichloride and bis(1,3-dicyclohexyl-4-imidazolin-2-ylidene)benzylideneruthenium dichloride: and ruthenium compounds having coordinated thereto a heterocyclic carbene compound and other neutral electron-donating compound, such as (1,3-dicyclohexylimidazolidin-2-ylidene)(tricyclohexylphosphine)benzylideneruthenium dichloride, (1,3-dicyclohexyl-4-imidazolin-2-ylidene)(tricyclohexylphosphine)benzylideneruthenium dichloride, [1,3-bis(2,4,6-trimethylphenyl)imidazolidin-2-ylidene](tricyclohexylphosphine)benzylideneruthenium dichloride, [1,3-bis(2,4,6-trimethylphenyl)imidazolidin-2-ylidene](pentamethylcyclopentadienyl)benzylideneruthenium dichloride, [1,3-bis(2,4,6-trimethylphenyl)-4-imidazolin-2-ylidene)(tricyclohexylphosphine)benzylideneruthenium dichloride and [1,3-bis(2,4,6-trimethylphenyl)-4- imidazolin-2-ylidene)(pentamethylcyclopentadienyl) benzylideneruthenium dichloride.

As specific examples of the polymerization catalyst represented by formula (7), there can be mentioned [(1,3-diisopropylimidazolin-2-ylidene)($CH_3CN$)$_3$Ru][$BF_4$]$_2$, [(1,3-diisopropylimidazolin-2-ylidene)($CH_3CN$)$_2$(Cl)Ru][$BF_4$], [(1,3-diisopropylimidazolin-2-ylidene)($CH_3CN$)$_3$Ru][$PF_6$]$_2$, [(1,3-dicyclohexylimidazolin-2-ylidene)($CH_3CN$)$_3$Ru] ($BF_4$)$_2$, [(1,3-dicyclohexylimidazolin-2-ylidene)($CH_3CN$)$_2$(Cl)Ru][$BF_4$], [(1,3-dicyclohexylimidazolin-2-ylidene) ($CH_3CN$)$_3$Ru][$PF_6$]$_2$, [(1,3-dimesitylimidazolidin-2-ylidene)($CH_3CN$)$_3$Ru][$BF_4$]$_2$, [(1,3-dimesitylimidazolin-2-ylidene)($CH_3CN$)$_2$(Cl)Ru][$BF_4$] and [(1,3-dimesitylimidazolin-2-ylidene)($CH_3CN$)$_3$Ru][$PF_6$]$_2$.

To enhance polymerization activity of the polymerization catalyst of formula (5), (6) or (7), polymerization auxiliaries such as, for example, diazo compounds such as $N_2CHCOOC_2H_5$, acetylene compounds such as phenylacetylene, and silyl compounds such as $(C_2H_5)_3SiH$ and $Ph_2MeSiH$ (Ph is phenyl, Me is methyl) can be added in an amount of 1 to 100 times by weight of the weight of ruthenium metal in the catalyst.

Among the above-recited catalysts, the polymerization catalyst of formula (6) is preferable because of high polymerization activity.

In the present invention, the polymerization may be carried out either in a solvent or without any solvent. In the case where, after completion of polymerization, the as-produced copolymer is hydrogenated in-situ without isolation of the copolymer, the polymerization is preferably carried out in a solvent. The solvent is not particularly limited provided that the copolymer Is soluble therein and the solvent does not adversely affect the polymerization.

As specific examples of the solvent, there can be mentioned aliphatic hydrocarbons such as pentane, hexane and heptane; alicyclic hydrocarbons such as cyclopentane, cyclohexane, methylcyclohexane, dimethylcyclohexane, trimethylcyclohexane, ethylcyclohexane, dimethylcyclohexane, decahydronaphthalene, bicycloheptane, tricyclodecane, hexahydroindene and cyclooctane; aromatic hydrocarbons such as benzene, toluene, xylene and mesitylene; nitrogen-containing hydrocarbons such as nitromethane, nitrobenzene, acetonitrile, propionitrile and benzonitrile; ethers such as diethyl ether, tetrahydrofuran and dioxane; and halogen-containing hydrocarbons such as chloroform, dichloromethane, 1,2-dichloroethane, chlorobenzene, dichlorobenzene and trichlorobenzene. Of these, aromatic hydrocarbons, aliphatic hydrocarbons, alicyclic hydrocarbons, ethers and halogen-containing hydrocarbons are preferably used because the copolymer is readily soluble in these solvents. Aromatic hydrocarbons, alicyclic hydrocarbons and ethers are especially preferable.

Where the polymerization is carried out in a solvent, the concentration of cycloolefin monomers is preferably in the range of 1 to 50% by weight, more preferably 2 to 45% by weight and especially preferably 5 to 40% by weight. When the monomer concentration is lower than 1% by weight, the productivity is reduced. In contrast, when the monomer concentration is higher than 50% by weight, the as-polymerized reaction mixture exhibits a too high viscosity and becomes difficult to hydrogenate in the succeeding hydrogenation step.

The amount of polymerization catalyst used in the process of the present invention is usually in the range of 1/100 to 1/2,000,000, preferably 1/500 to 1,000,000 and more preferably 1/1,000 to 1/500,000, as the ratio by mol of ruthenium metal in the polymerization catalyst to the cycloolefin monomers. When the amount of catalyst is larger than 1/100 by mol, the removal of catalyst after polymerization becomes difficult. In contrast, with a catalyst amount of smaller than 1/2,000,000 by mol, the polymerization activity is poor.

The polymerization reaction is initiated by mixing of cycloolefin monomers with a polymerization catalyst. The polymerization temperature is not particularly limited, but is usually in the range of $-100°$ C. to $200°$ C., preferably $-50°$ C. to $180°$ C., more preferably $-30°$ C. to $160°$ C. and most preferably $0°$ C. to $140°$ C. The polymerization time also is usually in the range of 1 minute to 100 hours, and can be appropriately chosen depending upon the proceeding of polymerization.

To control the molecular weight of a cycloolefin copolymer, a molecular weight modifier can be used. As specific examples of the molecular weight modifier, there can be mentioned α-olefins such as 1-butene, 1-pentene, 1-hexene and 1-octene; styrene and its analogues such as vinyltoluene; ethers such as ethyl vinyl ether, isobutyl vinyl ether and allyl glycidyl ether; other oxygen-containing vinyl compounds such as allyl acetate, allyl alcohol and glycidyl methacrylate; halogen-containing vinyl compounds such as allyl chloride; and nitrogen-containing vinyl compounds such as acrylamide. The amount of the molecular weight modifier can be appropriately chosen depending upon the desired molecular weight of ring-opened metathesis polymer, and is usually in the range of 0.1% to 100% by mol based on the cycloolefin monomers.

The ring-opened metathesis copolymer of the present invention comprises repeating units [A] having a carboxylic anhydride group, represented by formula (1), and repeating units [B] having no substituent or a hydrocarbon substituent, represented by formula (2), at an [A]/[B] ratio in the range of 5/95 to 95/5 by mol, preferably 10/90 to 90/10 by mol and more preferably 20/80 to 80/20 by mol. A ring-opened metathesis cycloolefin copolymer having a desired [A]/[B] ratio can be obtained by appropriately varying the ratio of the cycloolefin in monomer of formula (3) to the cycloolefin monomer of formula (4) as used for ring-opening copolymerization. The procedure for copolymerization is not particularly limited, but, where the above-mentioned polymerization catalyst and the polymerization procedure are employed, the copolymerizability between the monomer of formula (3) and the monomer of formula (4) is greatly enhanced as compared with the case where the conventional polymerization catalyst is used. Thus, a ring-opened metathesis cycloolefin copolymer having a desired composition can easily be obtained.

The ring-opened metathesis cycloolefin copolymer of the present invention has a weight average molecular weight in the range of 10,000 to 1,000,000, preferably 12,000 to 500,000 and more preferably 15,000 to 400,000, as measured by gel permeation chromatography and expressed in terms of polystyrene. When the molecular weight is smaller than 10,000, the copolymer has poor mechanical strengths. In contrast, when the molecular weight is larger than 1,000,000, the copolymer becomes difficult to efficiently hydrogenate in the succeeding hydrogenation step. The ratio (Mw/Mn) of the weight average molecular weight (Mw) to the number average molecular weight (Mn) is usually not larger than 6, preferably not larger than 3 and especially preferably in the range of 1.5 to 2.8. When the ratio (Mw/Mn) is smaller, a shaped article made from the copolymer has more improved mechanical strength. The ring-opened metathesis cycloolefin copolymer of the present invention has carbon-carbon double bonds in the backbone chain.

The hydrogenation product of a ring-opened metathesis cycloolefin copolymer of the present invention is prepared by hydrogenating carbon-carbon double bonds in the backbone chain of the copolymer. When carbon-carbon double bonds in the backbone chain of the copolymer are hydrogenated to be thereby saturated, heat resistance and weather resistance of the copolymer are further improved. The hydrogenation of the copolymer is carried out in the presence of hydrogen by using a hydrogenation catalyst. The organic ruthenium compound used for ring-opening metathesis copolymerization may be used for hydrogenation as it is, or a hydrogenation catalyst may be newly added.

When the ruthenium compound used for ring-opening metathesis copolymerization is used for hydrogenation as it is, the hydrogenation can be effected by feeding hydrogen to the polymerization mixture without addition of a hydrogenation catalyst after completion of the copolymerization. However, to steadily effect the hydrogenation reaction, it is preferable that a catalyst modifier such as ethyl vinyl ether or other α-olefin is added, or a method of newly adding a hydrogenation catalyst is employed. The hydrogenation catalyst is not particularly limited provided that it is generally used for hydrogenation of olefin compounds. The hydrogenation catalyst includes, for example, the following homogeneous catalysts and heterogeneous catalysts.

The homogeneous catalysts include Ziegler catalysts which are a combination of a transition metal compound with an alkali metal compound, and noble metal complex catalysts containing noble metal such as rhodium or ruthenium.

As specific examples of the combination of a transition metal compound with an alkali metal compound, there can be mentioned cobalt acetate/triethylaluminum, nickel acetylacetonato/triisobutylaluminum, titanocene dichloride/n-butyllithium, zirconocene dichloride/sec-butyllithium and tetrabutoxytitanate/dimethylmagnesium.

As specific examples of the noble metal complex catalysts containing noble metal such as rhodium or ruthenium, there can be mentioned organic ruthenium compounds represented by the formulae (5), (6) and (7), and chlorotris (triphenylphosphine)rhodium.

The heterogeneous catalysts include solid catalysts comprising nickel, palladium, platinum, rhodium or ruthenium, supported on a carrier such as carbon, silica, diatomaceous earth, alumina or titanium oxide. As specific examples of the solid catalysts, there can be mentioned nickel/silica, nickel/diatomaceous earth, nickel/alumina, palladium/carbon, palladium/silica, palladium/diatomaceous earth and palladium/alumina.

The hydrogenation reaction is usually carried out in an organic solvent. The organic solvent used can appropriately be chosen depending upon the solubility of the hydrogenation product produced. As specific examples of the organic solvent, there can be mentioned those which are hereinbefore recited as polymerization mediums used for ring-opening metathesis copolymerization.

When the organic solvent for hydrogenation is the same as the liquid medium used for polymerization, the hydrogenation reaction can be carried out by adding a hydrogenation catalyst to an as-polymerized polymerization mixture.

The hydrogenation conditions vary depending upon the particular hydrogenation catalyst used, but, the hydrogenation temperature is usually in the range of −20° C. to 250° C., preferably −10° C. to 220° C. and more preferably 0° C. to 200° C., and the hydrogen pressure is usually in the range of 0.1 to 50 kg/cm$^2$, preferably 0.5 to 40 kg/cm$^2$ and more preferably 1.0 to 30 kg/cm$^2$. When the hydrogenation temperature is lower than −20° C., the rate of hydrogenation reaction is low. In contrast, when the hydrogenation temperature is higher than 250° C., side reactions occur. When the hydrogen pressure is lower than 0.1 kg/cm$^2$, the rate of hydrogenation is low. In contrast, when the hydrogen pressure is higher than 50 kg/cm$^2$, a high-pressure-resistant reactor must be used.

In the process for producing the hydrogenation product of a ring-opened metathesis copolymer according to the present invention, when the hydrogenation time is in the range of 0.1 to 50 hours, at least 50%, preferably at least 70%, more preferably at least 80% and most preferably at least 90%, of the double bonds in the backbone chain of the copolymer can be hydrogenated.

The hydrogenation product of a ring-opened metathesis copolymer of the present invention is made by hydrogenating a ring-opened copolymer comprising repeating units [A] of formula (1) and repeating units [B] of formula (2), whereby double bonds in the backbone chain in repeating units [A] and repeating units [B] of the copolymer are converted to single bonds. The hydrogenation product comprises repeating units [A] and repeating units [B], wherein the double bonds in the backbone chain have been converted to single bonds, at an [A]/[B] ratio in the range of 5/95 to 95/5 by mol, preferably 10/90 to 90/10 by mol and more preferably 20/80 to 80/20.

The hydrogenation product of a ring-opened metathesis cycloolefin copolymer of the present invention has a weight average molecular weight in the range of 10,000 to 1,000,000, preferably 12,000 to 500,000 and more preferably 15,000 to 400,000, as measured by gel permeation chromatography and expressed in terms of polystyrene. The ratio (Mw/Mn) of the weight average molecular weight (Mw) to the number average molecular weight (Mn) is usually not larger than 7, preferably not larger than 3 and especially preferably in the range of 1.5 to 2.8. When the ratio (Mw/Mn) is smaller, a shaped article made from the copolymer has more improved mechanical strength.

The invention will now be more specifically described by the following examples and comparative examples, that by no means limit the scope of the invention. Parts and t in the examples and comparative examples are by weight unless otherwise specified.

(1) The molecular weight was measured by gel permeation chromatography (GPC) using tetrahydrofuran as solvent and expressed in terms of polystyrene.

(2) The composition ratio of repeating units derived from monomers in a copolymer was measured by 1H-NMR spectroscopy.

(3) The hydrogenation percentage was measured by $^1$H-NMR spectroscopy.

EXAMPLE 1

A glass reaction vessel equipped with a stirrer was charged with 240 parts of tetrahydrofuran, 3.9 parts of tetracyclo[4.4.0.1$^{2,5}$.1$^{7,10}$]-3-dodecene (TCD) and 36 parts of bicyclo[2.2.1]hept-5-ene-2,3-dicarboxylic anhydride (NBCH). Then a solution of 0.028 part of bis(1,3-diisopropyl-imidazolin-2-ylidene)benzylideneruthenium dichloride in 40 parts of tetrahydrofuran was added to conduct polymerization at 60° C. When 1 hour elapsed, the polymerization liquid was put in a large amount of isopropanol to precipitate a copolymer. The copolymer was filtered off and washed, and then dried at 40° C. under a reduced pressure for 40 hours.

The yield of the ring-opened copolymer was 12.5 parts. The molecular weight as expressed in terms of polystyrene was such that the number average molecular weight (Mn) was 27,500, and the weight average molecular weight (Mw) was 147,500. The monomeric composition ratio of the copolymer was TCD/NBCH=25/75 (mol/mol).

An autoclave equipped with a stirrer was charged with a solution of 5 parts of the above-mentioned ring-opened copolymer in 80 parts of teterahydrofuran. Then a hydrogenation catalyst solution, which was prepared by dissolving 0.5 part of bis(tricyclohexylphosphine) benzylideneruthenium(IV) dichloride and 1.8 parts of ethyl vinyl ether in 15 parts of tetrahydrofuran, was added to conduct hydrogenation reaction under a hydrogen pressure of 8 kg/cm$^2$ at 40° C. for 4 hours. The hydrogenation liquid was put in a large amount of isopropanol to completely precipitate a hydrogenated copolymer. The hydrogenated copolymer was filtered off and washed, and then dried at 40° C. under a reduced pressure for 40 hours to give a hydrogenation product of the ring-opened copolymer.

The molecular weight of the hydrogenation product as expressed in terms of polystyrene was such that the number average molecular weight (Mn) was 29,700, and the weight average molecular weight (Mw) was 188,100. The $^1$H-NMR measurement revealed that the carboxylic anhydride groups derived from a monomer were kept as they were, in the hydrogenation product, and at least 99% of the carbon-carbon double bonds in the backbone chain of the copolymer was hydrogenated by the hydrogenation procedure.

EXAMPLE 2

By the same procedures as described in Example 1, copolymerization, and precipitation and drying of copolymer were carried out to give a ring-opened copolymer except that the amount of catalyst used was changed to 0.28 part.

The yield of the copolymer was 35.8 parts. The molecular weight of the copolymer as expressed in terms of polystyrene was such that the number average molecular weight (Mn) was 23,500 and the weight average molecular weight (Mw) was 96,000, and Mw/Mn was 4.09. The monomeric composition ratio of the copolymer was TCD/NBCH=22/78 (mol/mol).

EXAMPLE 3

By the same procedures as described in Example 1, copolymerization was carried out to give a ring-opened copolymer except that a monomer charge comprised of 2 parts of tetracyclo[4,4.0.1$^{2,5}$.1$^{7,10}$]-3-dodecene (TCD) and 38 parts of bicyclo[2.2.1]hept-5H-ene-2,3-dicarboxylic anhydride (NBCH) was used.

The yield of the copolymer was 7.5 parts. The molecular weight of the copolymer as expressed in terms of polystyrene was such that the number average molecular weight (Mn) was 17,900 and the weight average molecular weight (Mw) was 31,700. The monomeric composition ratio of the copolymer was TCD/NBCH=21/79 (mol/mol).

By the same procedures as described in Example 1, the copolymer was hydrogenated to give a hydrogenation product of the copolymer. The molecular weight of the hydrogenation product as expressed in terms of polystyrene was such that the number average molecular weight (Mn) was 21,300 and the weight average molecular weight (Mw) was 37,800. The $^1$H-NMR measurement revealed that the carboxylic anhydride groups derived from a monomer were kept as they were, in the hydrogenation product, and at least 99% of the carbon-carbon double bonds in the backbone chain of the copolymer was hydrogenated by the hydrogenation procedure.

EXAMPLE 4

By the same procedures as described in Example 1, copolymerization was carried out to give a ring-opened copolymer except that a monomer charge comprised of 28 parts of tetracyclo[4.4.0.1$^{2,5}$.1$^{7,10}$]-3-dodecans (TCD) and 12 parts of bicyclo2.2.1]hept-5-ene-2,3-dicarboxylic anhydride (NBCH) was used.

The yield of the copolymer was 32.3 parts. The molecular weight of the copolymer as expressed in terms of polystyrene was such that the number average molecular weight (Mn) was 100,200 and the weight average molecular weight (Mw) was 183,400. The monomeric composition ratio of the copolymer was TCD/NBCH=75/25 (mol/mol).

By the same procedures as described in Example 1, the copolymer was hydrogenated to give a hydrogenation product of the copolymer. The molecular weight of the hydrogenation product as expressed in terms of polystyrene was such that the number average molecular weight (Mn) was 122,600 and the weight average molecular weight (Mw) was 192,300. The $^1$H-NMR measurement revealed that the carboxylic anhydride groups derived from a monomer were kept as they were, in the hydrogenation product, and at least 99% of the carbon-carbon double bonds in the backbone chant of the copolymer was hydrogenated by the hydrogenation procedure.

EXAMPLE 5

By the same procedures as described in Example 4, copolymerization was carried out to give a ring-opened copolymer except that [1,3-bis(2,4,6-trimethylphenyl) imidazolidin-2-ylidene)(tricyclohexylphosphine) benzylideneruthenium dichloride was used instead of bis(1, 3-diisopropyl-imidazolin-2-ylidene)benzylideneruthenium dichloride.

The yield of the copolymer was 25.8 parts. The molecular weight of the copolymer as expressed in terms of polystyrene was such that the number average molecular weight (Mn) was 123,200 and the weight average molecular weight (Mw) was 312,500. The monomeric composition ratio of the copolymer was TCD/NBCH=72/28 (mol/mol).

Comparative Example 1

By the same procedures as described in Example 4, copolymerization was carried out except that 0.053 part of tungsten hexachloride, 0.13 part of tetrabutyltin and 0.048 part of dibutyl ether were used instead of 0.028 part of bis(1,3-diisopropyl-imidazolin-2-ylidene) benzylideneruthenium dichloride. But, a copolymer was not produced.

Comparative Example 2

By the same procedures as described in Comparative Example 1, copolymerization was carried out except that 0.5 part of Mo(N-2,6-C$_6$H$_3$iPr$_2$)(CHCMe$_3$)(OtBu)$_2$ was used instead of 0.053 part of tungsten hexachloride, 0.13 part of tetrabutyltin and 0.048 part of dibutyl ether. But, a copolymer was not produced. The Mo-containing catalyst herein used is described as a catalyst capable of being used for ring-opening polymerization of an olefin having a polar group in Japanese Unexamined Patent Publication No. H11-130843. In the above-mentioned formula of the catalyst, iPr, Me and tBu means isopropyl, methyl and t-butyl, respectively.

Comparative Example 3

By the same procedures as described in Comparative Example 1, copolymerization was carried out to give a ring-opened copolymer except that 0.045 part of diethylaluminum chloride was used instead of 0.13 part of tetrabutyltin.

The yield of the copolymer was 0.8 part. The molecular weight of the copolymer as expressed in terms of polystyrene was such that the number average molecular weight (Mn) was 1,200 and the weight average molecular weight (Mw) was 3,600. The monomeric composition ratio of the copolymer was TCD/NBCH=99/1 (mol/mol).

Comparative Example 4

By exactly the same procedures as described in Example 1 of Japanese Examined Patent Publication No. S60-43365, norbornene-5,6-dicarboxylic anhydride was polymerized to give a ring-opened metathesis homopolymer as follows. That is, a 500 mL autoclave was flushed with nitrogen whereby the inner atmosphere was completely substituted with nitrogen. The autoclave was charged with 250 mL of 1,2-dichloroethane, 150 g of norbornene-5,6-dicarboxylic anhydride (0.91 mol as a monomer) and 1.0 mL of a diethylaluminum chloride solution in 1,2-dichloroethane having a concentration of 1.0 mol/L (concentration as an organometallic compound). The content was stirred at room temperature to give a uniform solution. Then, 3.0 mL of a solution of phenylethoxycarbenepentacarbonyl-tungsten $[(CO)_5WC(OC_2H_5)(C_6H_5)]$ in toluene having a concentration of 0.1 mol/L was added. The temperature of the mixture was elevated to 75° C., and the mixture was stirred at this temperature for 60 minutes to conduct polymerization.

After the completion of polymerization, about 50 mL of a solution containing about 1.0% by weight of 2,6-di-t-butyl-p-cresol in a mixed solvent comprised of 1,2-dichloroethane and methanol at a ratio of about 4:1 by volume was added to stop the polymerization. The polymerization liquid was put in about 1 liter of methanol to precipitate a polymer. The copolymer was filtered off and washed with methanol, and then dried at about 50° C. under a reduced pressure for about 24 hours.

Thus, a ring-opened homopolymer was obtained in a yield of 20.2 g. The molecular weight of the polymer was such that Mn was 23,000 and Mw was 39,000, and Mw/Mn was 1.70.

Comparative Example 5

By exactly the same procedures as described in Example 1 of Japanese Unexamined Patent Publication No. H11-130843, a ring-opened polymer of tetracyclododecene-3,4-dicarboxylic anhydride, which was partly hydrolyzed, was produced as follows.

A 500 mL autoclave equipped with a magnetic stirrer charged under a nitrogen atmosphere with 10.0 g (43.4 mmol) of tetracyclo[4.4.0.1$^{2,5}$.1$^{7,10}$]-8-dodecene-3,4-dicarboxylic anhydride as a cycloolefin monomer and 350 mL of tetrahydrofuran (hereinafter abbreviated to as "THF") with stirring to dissolve the tetracyclododecene-3,4-dicarboxylic anhydride in THF. Then 375 mg (0.77 mmol) of $Mo(N-2,6-C_6H_3iPr_2)(CHCMe_3)(OtBu)_2$ was added to carry out polymerization reaction at room temperature for 3 hours. Thereafter, 278 mg (3.85 mmol) of butylaldehyde was added and stirred for 30 minutes to stop the polymerization.

To the obtained ring-opened metathesis polymer-containing polymerization liquid, 570 mg (7.70 mmol) of trimethylenediamine was added and the mixture was stirred under a hydrogen pressure of 0.49 MPa at 80° C. for 1 hour. Then the polymerization liquid was put in 2 L of methanol to precipitate a ring-opened metathesis polymer. Thereafter the polymer was filtered off and washed with methanol, and then dried in vacuo to give 10.0 g of powdery ring-opened metathesis polymer.

In a 500 mL autoclave, 10.0 g of the powdery ring-opened metathesis polymer was dissolved in 800 mL of THF. Separately, 5.0 mg (0.004 mmol) of dichlorotetrakis-(triphenylphosphine)ruthenium and 2.1 mg (0.020 mmol) of triethylamine were dissolved in 80 mL of THF to prepare a hydrogenation catalyst solution. The hydrogenation catalyst solution was added into the autoclave and hydrogenation reaction was carried out under a hydrogen pressure of 8.1 MPa at 165° C. for 5 hours. Then the temperature was lowered to room temperature and hydrogen was expelled from the autoclave.

The thus-obtained liquid containing a hydrogenated product of the ring-opened metathesis polymer was put in methanol to precipitate the hydrogenated product of the ring-opened metathesis polymer. The hydrogenation product was filtered off and dried in vacuo to give a white powder. The degree of hydrogenation was 99%. The white powder was incorporated in a mixed liquid comprised of 600 ml of benzene and 1 mL of trifluoroacetic acid. Then the obtained mixture was stirred at room temperature for 30 minutes, and then, methanol was added to obtain a precipitate. The precipitate was filtered off and dried, and then the dried product was dissolved in THF. The obtained solution was out in a large amount of methanol to obtain a precipitate. The precipitate was filtered off and dried in vacuo to give a white powdery hydrogenation product of a ring-opened metathesis polymer.

The yield of the hydrogenation product of a ring-opened metathesis polymer was 8.0 g. The degree of hydrolysis was 25%. The molecular weight of the hydrolyzed hydrogenation product of polymer was such that Mn was 13,200 and Mw was 13,600, and Mw/Mn was 1.03.

EXAMPLES 6 TO 11

By the same procedures as described in Example 3, polymerization and hydrogenation were carried out wherein the monomers, kinds and amounts of which are shown in Table 1, were used in stead of 2 parts of tetracyclo[4.4.0.1$^{2,5}$.1$^{7,10}$]-3-dodecene (TCD) and 38 parts of bicyclo[2.2.1]hept-5-ene-2,3-dicarboxylic anhydride (NBCH). The molecular weights of the thus-obtained ring-opened metathesis copolymers and hydrogenation products thereof are shown in Table 1,

TABLE 1

| | Example No. | | | | | |
|---|---|---|---|---|---|---|
| | 6 | 7 | 8 | 9 | 10 | 11 |
| Monomer of Formula (3) | | | | | | |
| $R^1$ | $CH_3$ | Ph | nh*$_1$ | Ph | H | H |
| $R^2$ | H | H | H | H | H | H |
| m | 0 | 0 | 1 | 1 | 0 | 0 |
| Amount (parts) | 41.2 | 55.6 | 72.8 | 70.9 | 38.0 | 38.0 |
| Monomer of Formula (4) | | | | | | |
| $R^3$ | H | H | H | H | Ph | nh*$_1$ |
| $R^4$ | H | H | H | H | H | H |
| $R^5$ | H | H | H | H | H | H |
| $R^6$ | H | H | H | H | H | H |
| n | 1 | 1 | 1 | 1 | 1 | 1 |
| Amount (parts) | 2.0 | 2.0 | 2.0 | 2.0 | 3.0 | 3.1 |
| Copolymer Molecular Weight | | | | | | |
| Mn | 19,500 | 36,700 | 12,900 | 45,900 | 65,300 | 31,700 |
| Mw | 34,500 | 55,000 | 34,000 | 89,600 | 100,500 | 67,200 |
| Mw/Mn | 1.77 | 1.50 | 2.64 | 1.95 | 1.54 | 2.12 |
| Yield (parts) | 10.2 | 35.2 | 7.4 | 34.3 | 32.4 | 6.7 |
| TCD/NHCH ratio*$_2$ | 21/79 | 20/80 | 19/81 | 23/77 | 28/72 | 28/72 |
| Hydrogenation Product of Copolymer Molecular Weight | | | | | | |
| Mn | 24,500 | 38,900 | 20,600 | 48,100 | 69,700 | 38,900 |
| Mw | 39,300 | 59,500 | 41,700 | 92,900 | 109,900 | 68,200 |
| Mw/Mn | 1.60 | 1.53 | 2.02 | 1.93 | 1.58 | 1.75 |

Note,
nh*$_1$ n-hexyl
TCD/NBCH ratio*$_2$ Copolymerization ratio of TCD/NBCH by mol

EXAMPLE 12

2 parts of each of the norbornene copolymers or homopolymers (when the copolymers or homopolymers were hydrogenated, 2 parts of the hydrogenated products thereof), made in Examples 1 to 11 and Comparative Examples 3 to 5, was dissolved in 6.5 parts of chlorobenzene, and the thus-obtained solution was filtered under pressure to prepare a coating solution. A copper substrate or a silicon substrate was coated with the coating solution by a spin-coating procedure. The coated substrate was heated at 60° C. for 2 minutes, and then dried at 200° C. for 2 hours in a nitrogen gas atmosphere to form a film of a norbornene copolymer or homopolymer or a hydrogenation product thereof having a thickness of 30±1 μm, apparently adhered on the copper substrate or silicon substrate.

By substantially the same procedures as mentioned above, a film of a norbornene copolymer or homopolymer or its hydrogenation product having a thickness of about 5 μm, apparently adhered on a polytetrafluoroethylene substrate was formed, wherein spin-coating conditions were appropriately varied.

EXAMPLE 13

[Measurement of Water Absorption, Dielectric Constant and Dielectric Dissipation Factor]

Each film formed on a polytetrafluoroethylene substrate in Example 12 was carefully peeled from the substrate, and its water absorption was evaluated according to JIS K7209, and its dielectric constant and dielectric dissipation factor were evaluated according to JIS C2330. The results are shown in Table 2.

TABLE 2

| | Example No. | | | | | | |
|---|---|---|---|---|---|---|---|
| | 1 | 2 | 3 | 4 | 5 | 6 | 7 |
| Water absorp.*$_1$ (%) | 0.02 | 0.03 | 0.03 | 0.04 | 0.01 | 0.04 | 0.05 |
| Diel. const.*$_2$ | 2.68 | 2.79 | 2.89 | 2.76 | 2.99 | 2.85 | 2.65 |
| Diel. Dissipn.*$_3$ | 0.0002 | 0.0001 | 0.0002 | 0.0002 | 0.0001 | 0.0002 | 0.0001 |
| Example No. | 8 | 9 | 10 | 11 | C 1 | C 2 | C 3 |
| water absorp.*$_1$ (%) | 0.04 | 0.03 | 0.02 | 0.01 | <0.01 | 0.8 | 1.0 |
| Diel. const.*$_2$ | 2.74 | 2.87 | 2.67 | 2.66 | 2.33 | 3.20 | 3.30 |
| Diel. Dissipn.*$_3$ | 0.0002 | 0.0001 | 0.0002 | 0.0002 | 0.0001 | 0.05 | 0.06 |

Note,

TABLE 2-continued

*1Water absorption (%)
*2Dielectric constant at 1 kHz
*3Dielectric dissipation factor at 1 kHz
C: Comparative Example

EXAMPLE 14

Adhesion of each film adhered on copper substrate or silicon substrate, made in Example 12, was tested. Namely, the adhesion was evaluated by a cross-out tape testing method and an X-out tape testing method according to JIS K5400. The test results and glass transition temperature of film are shown in Table 3.

TABLE 3

| | Example No. | | | | | | |
|---|---|---|---|---|---|---|---|
| | 1 | 2 | 3 | 4 | 6 | 7 | 7 |
| Tg *1(° C.) | 190 | 195 | 192 | 190 | 200 | 192 | 210 |
| Adhesion (points) of Film on Copper Substrate | | | | | | | |
| Cross-cut method | 10 | 10 | 10 | 10 | 10 | 10 | 10 |
| X-cut method | 10 | 10 | 10 | 10 | 8 | 10 | 10 |
| Adhesion (points) of Film on Silicon Substrate | | | | | | | |
| Cross-cut method | 10 | 10 | 10 | 10 | 10 | 10 | 10 |
| X-cut method | 10 | 10 | 10 | 10 | 10 | 10 | 10 |

| Example No. | 8 | 9 | 10 | 11 | C 1 | C 2 | C 3 |
|---|---|---|---|---|---|---|---|
| Tg *1(° C.) | 186 | 204 | 203 | 182 | 165 | 170 | 175 |
| Adhesion (points) of Film on Copper Substrate | | | | | | | |
| Cross-cut method | 10 | 10 | 10 | 10 | 0 | 4 | 4 |
| X-out method | 10 | 10 | 10 | 10 | 0 | 4 | 8 |
| Adhesion (points) of Film on Silicon Substrate | | | | | | | |
| Cross-cut method | 10 | 10 | 10 | 10 | 0 | 4 | 4 |
| X-cut method | 10 | 10 | 10 | 10 | 2 | 4 | 2 |

Note,
*1Glass transition temperature (° C.)
C: Comparative Example
Cross-out method: cross-out tape testing method
X-cut method: x-cut tape testing method Films made from the polymers in the comparative examples exhibited a glass transition temperature in the range of 165 to 175° C. In contrast, films made from the polymers in Examples 1 to 11 exhibited a relatively high glass transition temperature in the range of 182° C. (lowest) to 210° C. (highest).

The film made from the polymers in Examples 1 to 11 exhibited a high adhesion to a copper substrate or silicon substrate.

INDUSTRIAL APPLICABILITY

In accordance with the present invention, a ring-opened metathesis copolymer and its hydrogenation product can be provided, which copolymer is comprised of repeating units [A] represented by the above-mentioned formula (1) and repeating units [B] represented by the above-mentioned formula (2), wherein the ratio of repeating units [A]/repeating units [B] is in the range of 5/95 to 95/5 by mol, and which copolymer has a weight average molecular weight in the range of 10,000 to 1,000,000 as measured by GPC and expressed in terms of polystyrene.

The ring-opened copolymer and its hydrogenation product have a low dielectric constant, a low water absorption, a high adhesion to metal, and a high heat resistance.

What is claimed is:

1. A ring-opened metathesis copolymer characterized by comprising repeating units [A] represented by the following general formula (1):

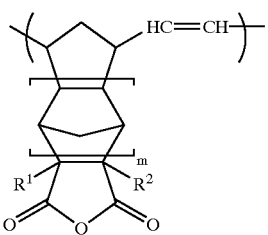

(1)

wherein O is an oxygen atom, $R^1$ and $R^2$ independently represent a hydrogen atom or a hydrocarbon group having 1 to 20 carbon atoms, and m is an integer of 0, 1 or 2, and repeating units [b] represented by the following general formula (2):

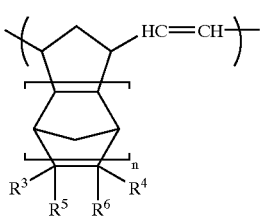

(2)

wherein $R^3$, $R^4$, $R^5$ and $R^6$ independently represent a hydrogen atom or a hydrocarbon group having 1 to 20 carbon atoms wherein $R^3$ or $R^5$ may be bonded together with $R^4$ or $R^6$ to form a ring, and n is an integer of 0, 1 or 2; the ratio of repeating units [A]/repeating units [B] being in the range of 5/95 to 95/5 by mol; said copolymer having a weight average molecular weight in the range of 10,000 to 1,000,000 as measured by gel permeation chromatography and expressed in terms of polystyrene.

2. A hydrogenation product of a ring-opened metathesis copolymer as claimed in claim 1, wherein 50 to 100% of the double bonds in the backbone chain of the ring-opened metathesis copolymer have been hydrogenated.

3. The hydrogenation product according to claim 2, wherein the repeating units [A] are derived from at least one kind of a monomer selected from bicyclo[2.2.1]hept-5-ene-2,3-dicarboxylic anhydride, tetracyclo[4.4.0.1$^{2,5}$.1$^{7,10}$]-8-dodecene-3,4-dicarboxylic anhydride and hexacyclo[6.6.1.1$^{3,6}$.1$^{10,13}$.0$^{2,7}$.0$^{9,14}$]-11-heptadecene-4,5-dicarboxylic anhydride.

4. The hydrogenation product according to claim 2, wherein the repeating units [B] are derived from at least one kind of a monomer selected from bicyclo[2.2.1]hept-5-ene, 2-hexylbicyclo[2.2.1]hept-5-ene, 2-decylbicyclo[2.2.1]hept-5-ene, 2-phenylbicyclo[2.2.1]hept-5-ene, tricyclo[4.3.1$^{2,5}$.0]-3-decene, tricyclo[4.3.1$^{2,5}$.0]deca-3,7-diene, tetracyclo[6.5.1$^{2,5}$.0$^{1,6}$.0$^{8,13}$]tetradeca-3,8,10,12-tetraene, tetracyclo[4.4.0.1$^{2,5}$.1$^{7,10}$]-3-dodecene, 8-ethylidenetetracyclo[4.4.0.1$^{2,5}$.1$^{7,10}$]-3-dodecene, hexacyclo[6.6.1.1$^{3,6}$.1$^{10,13}$.0$^{2,7}$.0$^{9,14}$]-4-heptadecene and 11-phenylhexacyclo[6.6.1.1$^{3,6}$.1$^{10,13}$.0$^{2,7}$.0$^{9,14}$]-4-heptadecene.

5. The hydrogenation product according to claim 2, wherein the repeating units [B] are derived from at least one kind of a monomer selected from tricyclo[4.3.1$^{2,5}$.0]-3-decene, tricyclo[4.3.1$^{2,5}$.0]deca-3,7-diene, tetracyclo[6.5.1$^{2,5}$.0$^{1,6}$.0$^{8,13}$]tetradeca-3,8,10,12-tetraene, tetracyclo[4.4.0.1$^{2,5}$.1$^{7,10}$]-3-dodecene and 8-ethylidenetetracyclo[4.4.0.1$^{2,5}$.1$^{7,10}$]-3-dodecene.

6. A process for producing a ring-opened metathesis copolymer, characterized by copolymerizing at least one kind of a cycloolefin monomer represented by the following general formula (3):

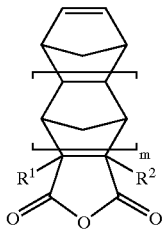

(3)

wherein O is an oxygen atom, R$^1$ and R$^2$ independently represent a hydrogen atom or a hydrocarbon group having 1 to 20 carbon atoms, and m is an integer of 0, 1 or 2, with at least one kind of a monomer represented by the following general formula (4):

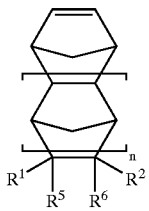

(4)

wherein R$^3$, R$^4$, R$^5$, R$^6$ independently represent a hydrogen atom or a hydrocarbon group having 1 to 20 carbon atoms wherein R$^3$ or R$^5$ may be bonded together with R$^4$ or R$^6$ to form a ring, and n is an integer of 0, 1 or 2, by a ring-opening metathesis copolymerization procedure using a polymerization catalyst comprising as a principal ingredient an organic ruthenium compound having coordinated thereto a heterocyclic carbene compound as ligand.

7. A process for producing the hydrogenation product of a ring-opened metathesis copolymer characterized by:
copolymerizing at least one kind of a cycloolefin monomer represented by the following general formula (3):

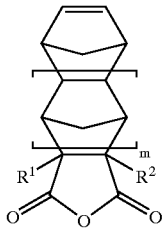

(3)

wherein O, is an oxygen atom, R$^1$ and R$^2$ independently represent a hydrogen atom or a hydrocarbon group having 1 to 20 carbon atoms, and m is an integer of 0, 1 or 2, with at least one kind of a cycloolefin monomer represented by the following general formula (4):

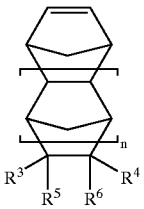

(4)

wherein R$^3$, R$^4$, R$^5$ and R$^6$ independently represent a hydrogen atom or a hydrocarbon group having 1 to 20 carbon atoms wherein R$^3$ or R$^5$ may be bonded together with R$^4$ or R$^6$ to form a ring, and n is an integer of 0, 1 or 2, by a ring-opening metathesis copolymerization procedure using a polymerization catalyst comprising as a principal ingredient an organic ruthenium compound having coordinated thereto a heterocyclic carbene compound as ligand; and then,
hydrogenating the double bonds in the backbone chain of the thus-obtained ring-opened metathesis copolymer in the presence of hydrogen by using a hydrogenation catalyst.

8. The process for producing the hydrogenation product according to claim 7, wherein the heterocyclic carbene compound has bulky substituents at hetero atoms constituting the hetero ring of the compound.

9. The process for producing the hydrogenation product according to claim 7, wherein the polymerization catalyst comprises as a principal ingredient a ruthenium compound represented by the following formula (6):

(6)

wherein M$^2$ is a ruthenium atom, L$^2$s independently represent a neutral electron-donating ligand wherein at least one of L$^2$s is a heterocyclic carbene compound, Y$^2$s independently represent an anionic ligand, Qs independently represent a hydrogen atom or a hydrocarbon group having 1 to 20 carbon atoms which may have a substituent having a halogen, nitrogen, oxygen, silicon, phosphorus or sulfur atom, r is an integer of 1 or 2, and p, q and y independently represent an integer in the range of 1 to 4.

10. The process for producing the hydrogenation product according to claim 7, wherein the heterocyclic carbene compound is represented by the following formula (8) or (9):

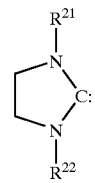

(8)

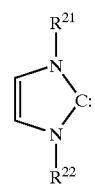

(9)

wherein R$^{21}$ and R$^{22}$ independently represent a hydrogen atom or a hydrocarbon group having 1 to 20 carbon atoms which may have a substituent containing at least one kind of atom selected from halogen, oxygen, nitrogen, sulfur, phosphorus and silicon atoms.

* * * * *